United States Patent [19]
Schaumburg et al.

[11] Patent Number: 5,331,800
[45] Date of Patent: Jul. 26, 1994

[54] APPARATUS FOR MAKING A CABLE BY ROEBLING RECTANGULAR CROSS-SECTIONED STRANDS

[75] Inventors: Wilhelm Schaumburg, Arolsen; Hartmut Gottschling, Arolsen-Mengeringhausen, both of Fed. Rep. of Germany

[73] Assignee: Lackdraht Union GmbH, Sulingen, Fed. Rep. of Germany

[21] Appl. No.: 849,276

[22] Filed: Mar. 10, 1992

Related U.S. Application Data

[63] Continuation-in-part of Ser. No. 529,908, May 29, 1990, abandoned.

[30] Foreign Application Priority Data

Jul. 15, 1989 [DE] Fed. Rep. of Germany ....... 3923448

[51] Int. Cl.$^5$ .......................... D07B 1/06; B23P 19/00
[52] U.S. Cl. ...................................... 57/311; 29/605; 29/606; 29/736; 57/1 R
[58] Field of Search ................... 140/149; 57/311, 314, 57/1 R; 29/596, 598, 606, 605, 736

[56] References Cited

U.S. PATENT DOCUMENTS

| | | | |
|---|---|---|---|
| 2,249,509 | 7/1941 | Welch et al. | 57/59 |
| 2,986,176 | 5/1961 | West | 57/59 |
| 3,000,406 | 9/1961 | West | 57/59 |
| 3,018,802 | 1/1962 | Hinds | 140/71 R |
| 3,154,112 | 10/1964 | St. Jacques | 140/149 X |
| 3,572,024 | 3/1971 | Lyon | 57/314 X |
| 4,304,033 | 12/1981 | Sakaue et al. | 29/736 X |
| 4,319,448 | 3/1982 | Jozwicki et al. | 57/403 |
| 4,329,764 | 5/1982 | Sakaue et al. | 29/596 |

FOREIGN PATENT DOCUMENTS

| | | | |
|---|---|---|---|
| 126703 | 10/1977 | Japan | 29/564.1 |
| 969086 | 9/1964 | United Kingdom . | |

Primary Examiner—Daniel P. Stodola
Assistant Examiner—William Stryjewski
Attorney, Agent, or Firm—Michael J. Striker

[57] ABSTRACT

The apparatus for making a cable by roebling individual rectangular cross-sectioned strands includes two pressing elements, each of the pressing elements extending in a direction (y-axis) perpendicular to the conveying direction (z-direction), engaging different stacks from the top side and bottom side of the cable respectively and being displaceable in opposite directions in a timed reciprocating manner to move stacks toward each other; two nonrotatable pushing members, each of which being mounted on opposite lateral sides of the cable, being structured and positioned to be moveable in another direction (x-axis) perpendicular to and across the conveying direction (z-axis) to displace respective individual strands to adjacent stacks and to simultaneously bend them; a nonrotatable counterabutment member spaced along the conveying direction from each of said pushing members and being mounted to be moveable oppositely to the pushing member associated therewith; a device for adjusting, prior to roebling, a spacing between each of the pushing members and nonrotatable counterabutment members associated therewith; and a hydraulic or pneumatic drive for moveably operating each of the pushing members and the pressing elements and an electronic control device synchronization of the drives.

9 Claims, 6 Drawing Sheets

APPARATUS FOR MAKING A CABLE BY ROEBLING RECTANGULAR CROSS-SECTIONED STRANDS

The invention relates to an apparatus for making a cable by roebling individual strands having a rectangular cross-section. This application is a continuation-in-part of application Ser. No. 529,908, filed May 29, 1990.

BACKGROUND OF THE INVENTION

The known apparatus for making a composite cable made of individual rectangular cross-sectioned strands has guide means for individual strands conveyed in two parallel stacks formed by lateral parallel guide surfaces; pressing elements, each of which extends perpendicular to the lateral guide surfaces and is engagable with a different stack, the two parallel stacks being conveyed between the two pressing elements which are displaceable in parallel oppositely to each other in a timed manner to press and release the stacks; and two nonrotatable pushing members mounted on the opposite lateral sides of the cable but pivotally displaced from the pressing elements, the pushing members being structured and positioned to be able to move across the conveying direction to displace at least one of the individual strands from each of the stacks to the other adjacent stack as well as bending the individual strand so displaced.

An apparatus having the above-mentioned features is described in British Patent 969,086. In this apparatus individual rectangular cross-sectioned strands pass through a roebling tool in stacks disposed in parallel beside each other and, as a result of the operation of the apparatus, a composite electrical cable is produced. The periphery of the strand formed by the stacked individual strands is engaged by pushing members, which displace top and bottom individual strands to the adjacent stack and bend the cable. This operation, which enables rectangular cross-sectioned strands to be twisted, is known as "roebling". The apparatus is called a "roebling" tool in honor of the inventor of the first roebling tool, Roebel.

In addition to two pushing members for displacing the top and bottom strand to the adjacent stack, the prior art roebling tool has two pressing elements, each of which pushes one of the stacks of individual strands upwards and downwards. On completion of the pushing of the stacks up or down, the pushing members engage the individual strands to displace them as described above. The course followed in the roebling of the individual strands of the composite cable and the composite cable is explained in detail, for example, in U.S. Pat. No. 2,249,509 and diagrammatically illustrated in FIG. 1a to 1c in the case of an even number of individual strands. FIG. 1a shows the starting condition of the two adjacent stacks of individual strands 1 of rectangular cross-section. The individual strands 1 are moved toward and somewhat past each other by the thickness of an individual strand by engagement of pressing elements, which engage on the top and bottom of the respective two stacks (in the direction indicated by arrows 2 in FIG. 1b). The top and bottom individual strands are then immediately displaced by pushing members onto the respective adjacent stack (in the direction indicated by arrow 3 in FIG. 1c). At the same time the two individual strands acted on by the pushing members are bent. FIG. 2 shows in perspective a composite cable in which the top and bottom individual strands are each bent, the bending places being denoted by reference number 4.

One disadvantage of the prior art apparatus is that the bending length—i.e. the length from start to end of a bend—is comparatively large. With equal length of step—i.e. the distance between successive bends—this leads to correspondingly short parallel sections of the individual strands, resulting in a deterioration in winding properties, especially in the case of composite cable having a large number of individual strands. If the parallel portions of the individual strands are lengthened, the length of step becomes correspondingly longer, and this also causes the winding properties to deteriorate.

SUMMARY OF THE INVENTION

It is an object of the present invention to maintain the bending length and therefore the length of step and lay of the cable as short as possible when twisting individual strands of rectangular cross-section. The windability of the cable can be improved in this way and, more particularly, smaller winding diameters can be achieved, the result being a more compact structure.

According to the invention, the roebling tool providing improved windability includes apparatus for making a cable by roebling individual rectangular cross-sectioned strands comprises guide means for a plurality of individual rectangular cross-sectioned strands conveyed in two parallel stacks in a conveying direction (z-axis), the two stacks being conveyed in lateral contact with each other; two pressing elements, each of the pressing elements extending in a direction (y-axis) perpendicular to the conveying direction (z-direction) and one of the pressing elements being engageable with one of the stacks from the top side of the cable and the other of the pressing elements being engagable with the other of the stacks from the bottom side of the cable, the pressing elements being displaceable in opposite directions in a timed reciprocating manner to move the stacks toward and away from each other; two nonrotatable pushing members, each of the pushing members being mounted on opposite lateral sides of the cable, the pushing members being structured and positioned to be able to move in another direction (x-axis) perpendicular to and across the conveying direction (z-axis) to displace respective individual strands to adjacent ones of the stacks and to simultaneously bend the individual strands; a nonrotatable counterabutment member spaced along the conveying direction from each of the pushing member and being mounted to be moveable oppositely to the pushing member associated therewith; means for adjusting, prior to roebling, a spacing between each of the nonrotatable pushing members and the nonrotatable counterabutment member associated therewith; and a drive for moveably operating each of the pushing members and the pressing elements and a control device for synchronized timed actuation of the drives for separate displacement of the pressing elements and pushing members, each of the drives being one of a hydraulic and pneumatic device and being controllable by the control device to control the relative positions of the pushing members and pressing elements during conveying of the two parallel stacks of individual strands to form the cable.

The use of counterabutment members which are adjustably spaceable from the corresponding pushing members during bending of the top and bottom individual strand of the stack enables the bending length to be shortened or otherwise adjusted. The means for adjusting this spacing can include a threaded spindle on which the supports for the counterabutment member and pushing member are mounted. Also the bending can be performed more precisely than with the prior art roebling took disclosed in British Patent 969,086.

Furthermore, use of nonrotatable pushing members and counterabutment members provides a structure which is subject to less wear and mechanical problems than prior art structures having rotatable elements for pushing members.

In a preferred embodiment of the invention, each of the pushing members and the counterabutment members have a scanning surface on which an individual strand projecting from the stack due to action of the pressing elements bears and also a spacing plate having a thickness corresponding to the thickness of an individual strand releasably attached to the scanning surface of each of the pushing members and counterabutment members. The spacing plates may be replaceable with spacing plates of a different thickness. Alternatively, a setscrew may be provided as means for adjusting the thickness (height above the scanning surface) of the spacing plate.

Another advantage to the counterabutment members of the above described structure is that during bending of an individual strand the individual strand no longer bears against the adjacent strand, but against counterabutment members, thus preventing damage to the insulation of the individual strand.

In the roebling tool advantageously the pushing members, the counterabutment members and the pressing elements can be moved in synchronism by an electronically controlled hydraulic or pneumatic drive. This enables the individual elements of the roebling tool to be individually actuated while cooperating precisely harmonized—i.e., synchronously. In comparison with the purely mechanical actuation of the tool elements, as described in British Patent 969,086, consisting of cooperating cams, eccentrics and a common toothed rim producing the synchronization of the tool elements, the advantages of the preferred pneumatic or hydraulic method of operation are that a more precise harmonizable and simpler control device can be used. The fact that parts having a high degree of wear susceptibility are absent is important in simplifying the control system.

The apparatus also includes means for applying an adjustable pressure to the strands with the pushing members and the counterabutment members to maintain their clearly defined positions on the individual strands and enable them to follow the strand resiliently when it is deflected. Of course the means for applying adjustable pressure can be part of the hydraulic or pneumatic drive device.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1A:
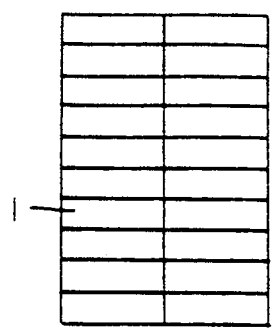
FIG. 1a to 1c are diagrammatic cross-sectional views showing the roebling of two stacks of rectangular cross-sectioned individual strands into a cable using the roebling tool shown in FIG. 3.
Figure 1B:
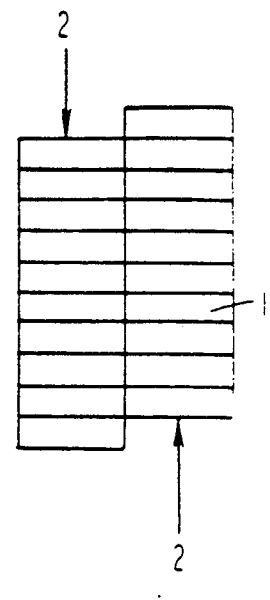
Figure 1C:
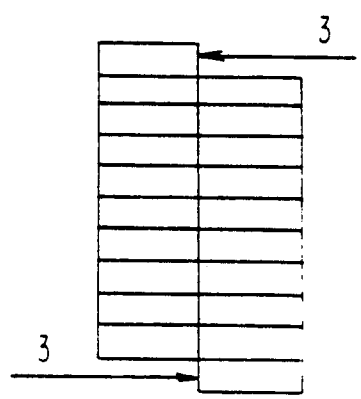
Figure 2:
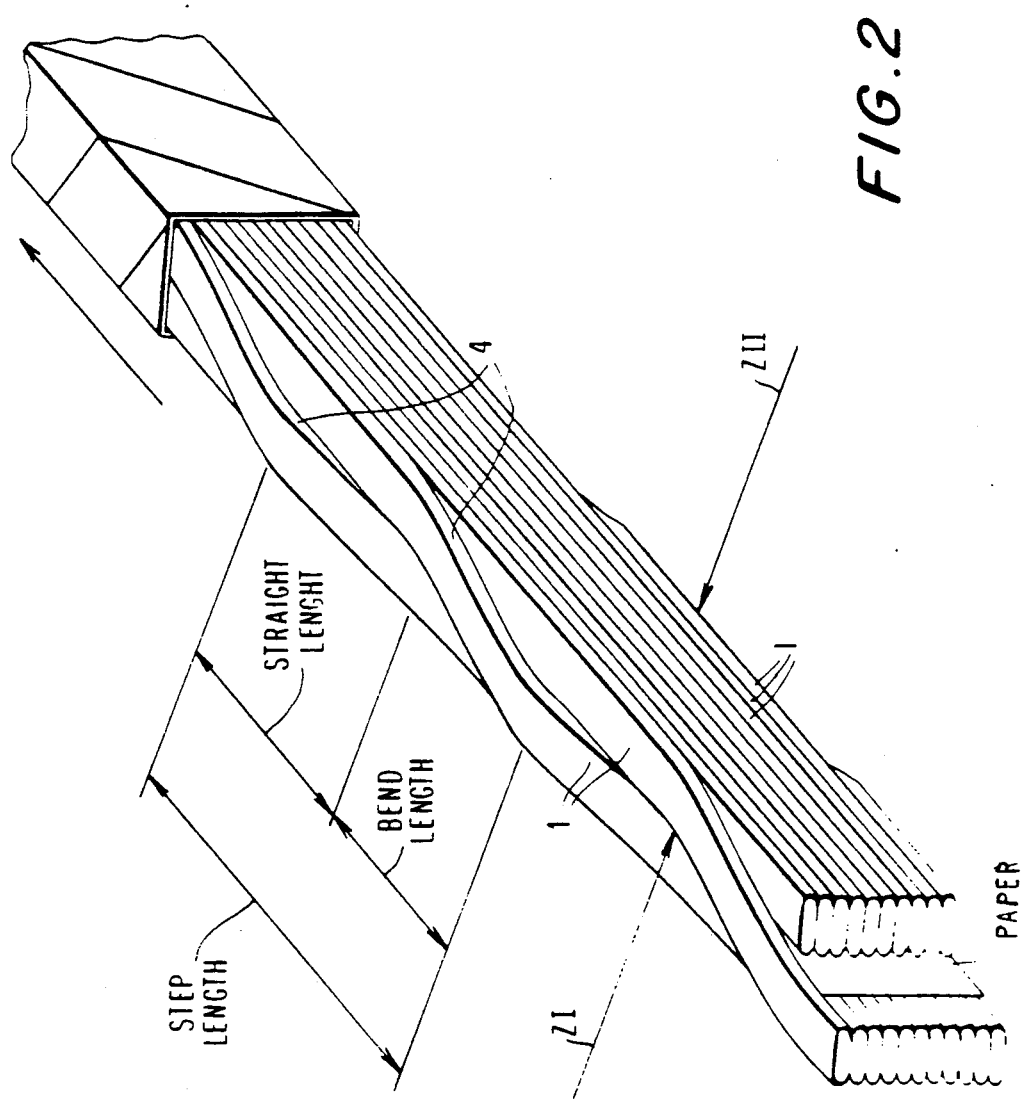
FIG. 2 is a perspective view of the cable formed by roebling a number of individual strands with the apparatus shown in FIG. 3.
Figure 3:
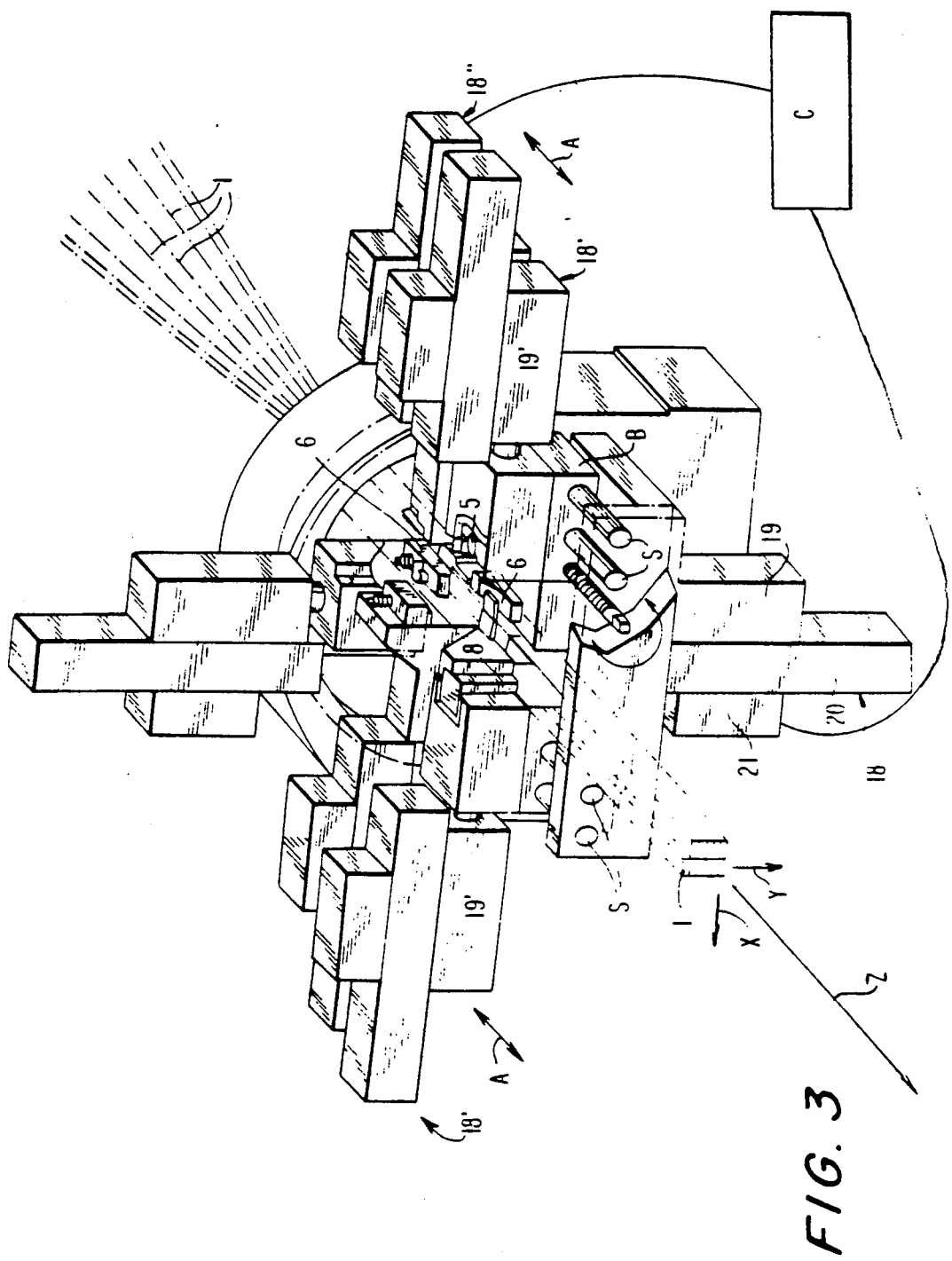
FIG. 3 is a partially cutaway perspective view of a roebling tool according to the invention.

One embodiment of the roebling tool according to the invention is shown in FIG. 3. This roebling tool includes two nonrotatable pushing members 5 on opposite lateral sides of the two adjacent stacks of rectangular cross-sectioned individual strands 1. These pushing members 5 act on the lateral sides of the individual strands 1. It also includes two pressing elements 6, one of which acts on one stack from either a top side or a bottom side of the cable and the other of which acts on the other adjacent stack from below or above.

In addition to the nonrotatable pushing members 5 and the pressing elements 6, two nonrotatable counterabutment members 8 are provided. Each of these counterabutment members 8 is spaced in the z-axis direction (FIG. 3) from one of the pushing members 5 and also acts on the lateral surfaces of the individual cable strands 1.

Figure 7:
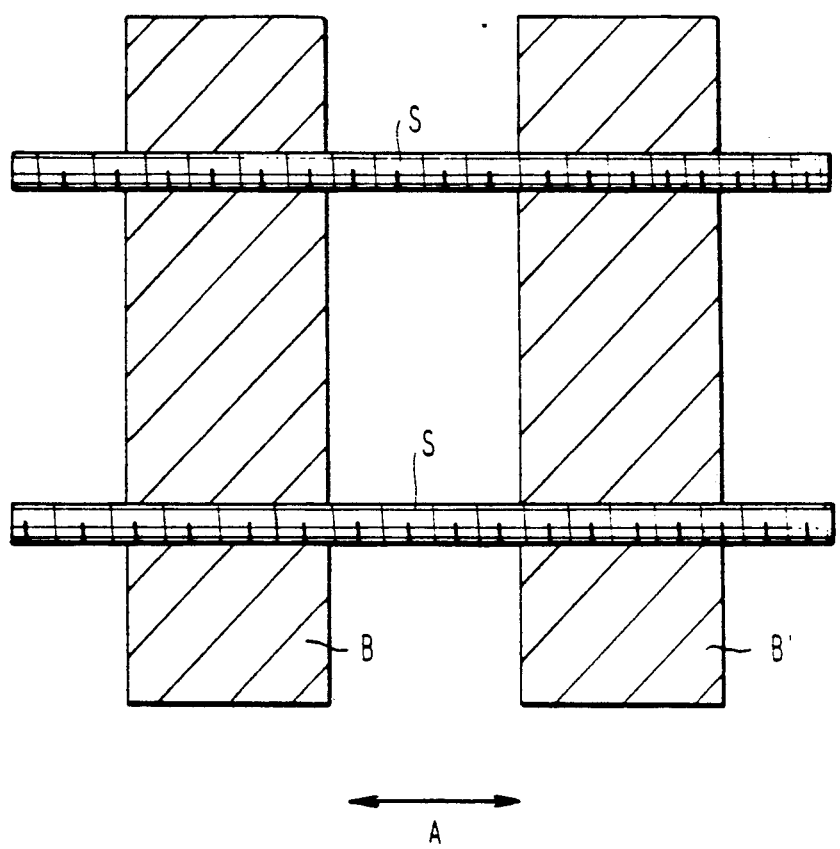
FIG. 7 is a cross-sectional view through the supports B,B' for the pushing members and the counterabutment members respectively showing how the distance between the pushing members and counterabutment members is adjusted.

The distance between the counterabutment members 8 and their associated pushing members 5 is adjustable by means for spacing including the spindles S shown in FIG. 3 and in more detail in FIG. 7. By turning the spindles S the distance between the supports B,B' for a pushing member 5 and its associated counterabutment member 8 is varied.

The pushing members 5 and counterabutment members 8 are nonrotatable.

Figure 4:
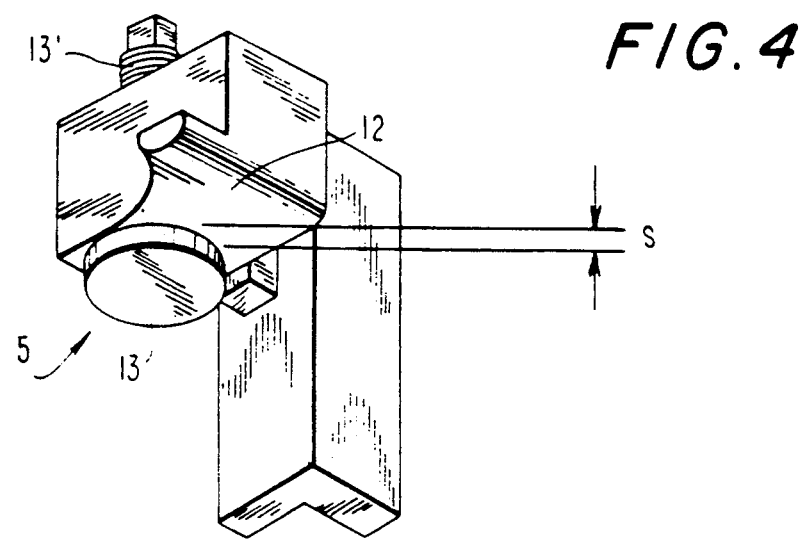
FIG. 4 is a perspective view of a pushing member of the roebling tool shown in FIG. 3.
Figure 5:
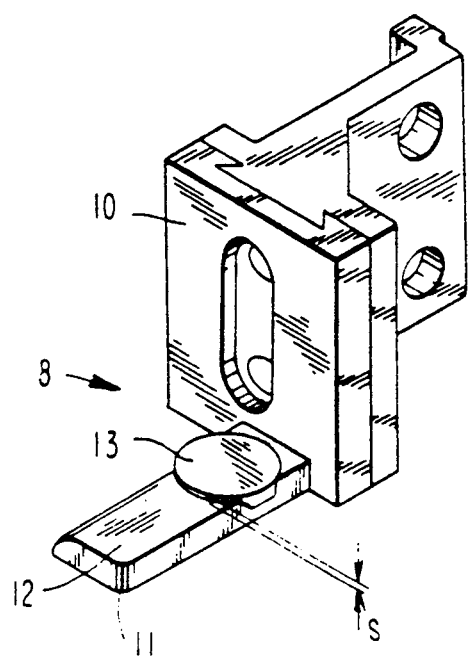
FIG. 5 is a perspective view of a counterabutment member of the roebling tool shown in FIG. 3.

The pushing members 5 and the counterabutment members 8 are shown in more detail FIGS. 4 and 5. Each counterabutment member 8 has a surface 10 and a finger 11 extending at right angles from the surface 10. The finger 11 and also pushing member 5 have scanning surfaces 12 on which the individual strands 1 can rest during roebling. Each pushing member 5 and each counterabutment member 8 also has a small spacing plate 13 which is mounted releasably exchangable on the scanning surface. Also the small spacing plate 13 can be vertically adjustable. For example, the spacing plate 13 can be attached to a set screw 13' (FIG. 4). The height or apparent thickness of the spacing plate 13 can then be varied by rotation of the set screw 13'. If different thickness individual strands are to be used to make a composite cable the spacing plate 13 can be removed and replaced with another of a different thickness. Alternatively, the spacing plate 13 can De detachable and replaceable by a spacing plate 13 of a different dimension.

FIG. 3 also shows hydraulic or pneumatic drives 18, 18' and 18" for the pressing elements 6, counterabutment members 8 and pushing members 5 respectively. Each drive 18, 18' or 18" includes a hydraulic device 19, 19', a distributing valve 20 for hydraulic fluid or pressurized air and an electric control box 21. The hydraulic device can be a piston-cylinder device. In addition a controller C is provided for controlling and synchronizing each of the six drives. The controller C provides a means for adjusting the pressure applied by each of the pressing elements 6, counterabutment members 8 and pushing members 5. The controller C also controls the travel or displacement of each individual drive 18, 18' or 18" and hence the position of the pressing elements 6, counterabutment members 8 and pushing members 5.

Figure 6:
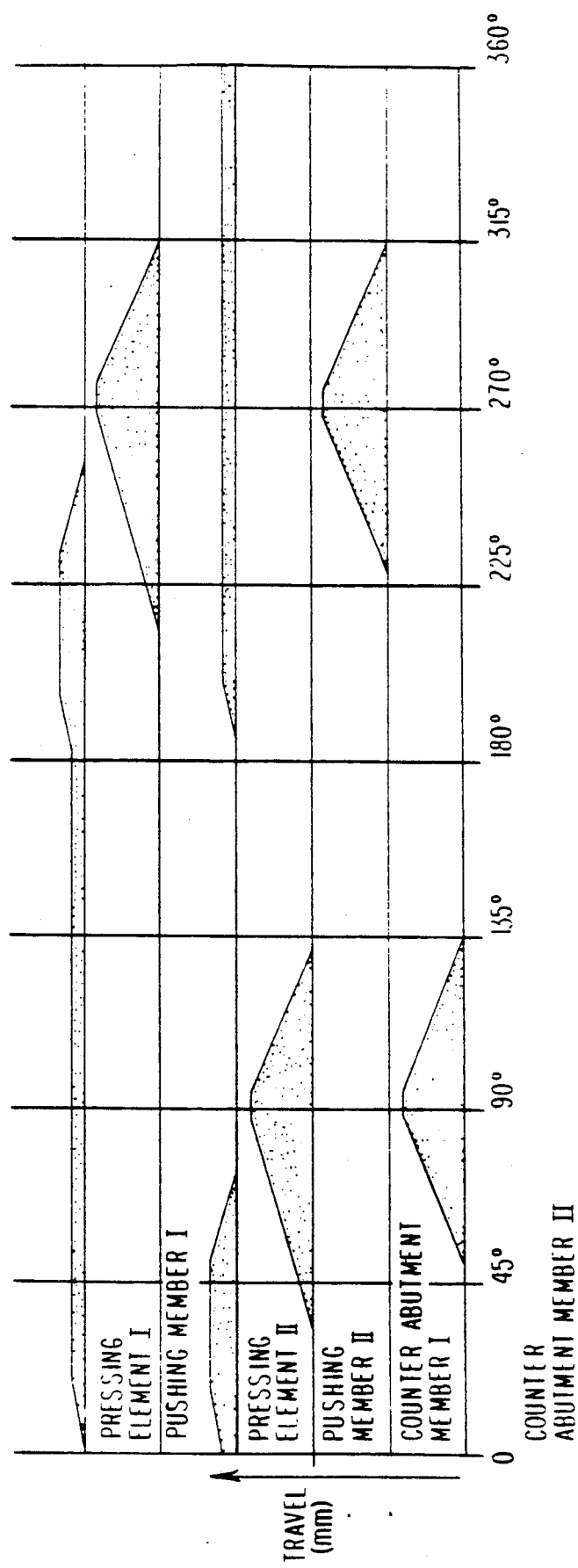
FIG. 6 is a graphical illustration of the travel of the pushing members, pressing elements and counterabutment members during operation of the roebling tool of FIG. 3.

The travel of the two pressing elements 6, two counterabutment members 8 and two pushing members 5 in timed operation of the roebling tool is shown in FIG. 6 for a composite cable having an odd number of individual rectangular cross-sectioned strands. The operating cycle begins with the relative displacement of the two stacks of individual strands from the top and bottom side of the cable in opposite directions along the y axis shown in FIG. 3 by respective pressing elements 6,I and 6,II. After that the associated pushing members 5,II and counterabutment members 8,II act to push the projecting individual strand onto the adjacent stack and the projecting strand is also bent at the same time. The pushing member 5,I and the associated counterabutment member 8,I then act to displace the projecting strand on the opposite side and also to bend it. These movements are shown graphically in FIG. 6.

It will be understood that each of the elements described above, or two or more together, may also find a useful application in other types of constructions differing from the types described above.

The guide means can include surfaces of the pressing elements, pushing members and counterabutments.

While the invention has been illustrated and described as embodied in a apparatus for making a cable by roebling rectangular cross-sectioned individual strands, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. An apparatus for making a cable by roebling individual rectangular cross-sectioned strands, said cable having opposite lateral sides and top and bottom sides and a rectangular cross-section, said apparatus comprising guide means for a plurality of individual rectangular cross-sectioned strands conveyed in two parallel stacks in a conveying direction, the two stacks being conveyed in lateral contact with each other; two pressing elements, each of said pressing elements extending in a direction perpendicular to said conveying direction and one of said pressing elements being engageable with one of said stacks from the top side of the cable and the other of said pressing elements being engagable with the other of said stacks from the bottom side of the cable, said pressing elements being displaceable in opposite directions to move said stacks toward each other; two nonrotatable pushing members, each of said pushing members being mounted on opposite lateral sides of said cable, said pushing members being structured and positioned to move in another direction perpendicular to and across the conveying direction to displace respective individual strands to adjacent ones of said stacks and to simultaneously bend said individual strands; a nonrotatable counterabutment member spaced along said conveying direction from each of said pushing member and being mounted to be moveable oppositely to the pushing member associated therewith; means for adjusting, prior to said roebling, a spacing between each of said nonrotatable pushing members and said nonrotatable counterabutment member associated therewith; and a drive for moveably operating each of said pushing members and said pressing elements and a control device for synchronized timed actuation of the drives for separate displacement of the pressing elements and pushing members to control relative positions of said pushing members and pressing elements during conveying of said two parallel stacks so as to form said cable.

2. An apparatus as defined in claim 1, wherein said control device is electronic and each of said drives comprises a hydraulic piston-cylinder device.

3. An apparatus as defined in claim 1, wherein each of said pushing members and said counterabutment members have a scanning surface, said scanning surface of one of said pushing members and said scanning surface of said counterabutment member spaced from said one pushing member along said conveying direction resting against the top side of said cable and said scanning surface of another of said pushing members and said scanning surface of said counterabutment member spaced from said other pushing member along said conveying direction resting against the bottom side of said cable in operation, and a spacing plate is arranged on said scanning surface and has a height above said scanning surface corresponding to a thickness of one of said individual strands.

4. An apparatus as defined in claim 1, wherein each of said pushing members and said counterabutment members have a scanning surface, said scanning surface of one of said pushing members and said scanning surface of said counterabutment members spaced from said one pushing member along said conveying direction resting against the top side of said cable and said scanning surface of another of said pushing members and said scanning surface of said counterabutment member spaced from said other pushing member along said conveying direction resting against the bottom side of said cable in operation, and a spacing plate is arranged on said scanning surface, has a height above said scanning surface and has means for adjusting the height of the spacing plate from the scanning surface.

5. An apparatus as defined in claim 1, further comprising means for applying an adjustable pressure to one of said strands with said pushing members and said counterabutment members.

6. An apparatus as defined in claim 1, wherein each of said drives is a pneumatic device.

7. An apparatus for making a cable by roebling individual rectangular cross-sectioned strands, said cable having opposite lateral sides and top and bottom sides and a rectangular cross-section, said apparatus comprising guide means for a plurality of individual rectangular cross-sectioned strands conveyed in two parallel stacks in a conveying direction, the two stacks being conveyed in lateral contact with each other; two pressing elements, each of said pressing elements extending in a direction perpendicular to said conveying direction and one of said pressing elements being engageable with one of said stacks from the top side of the cable and the other of said pressing elements being engagable with the other of said stacks from the bottom side of the cable, said pressing elements being displaceable in opposite directions in a timed reciprocating manner to move said stacks toward each other; two nonrotatable pushing members, each of said nonrotatable pushing members being mounted on opposite lateral sides of said cable, said nonrotatable pushing members being structured and positioned to move in another direction perpendicular to and across the conveying direction to displace respective individual strands to adjacent ones of said stacks and to simultaneously bend said individual strands; a nonrotatable counterabutment member spaced along said conveying direction from each of said nonrotatable pushing member and being mounted to be moveable oppositely to said nonrotatable pushing member associated therewith; means for adjusting, prior to said roebling, a spacing between each of said nonrotatable pushing members and said nonrotatable counterabutment members; and a hydraulic drive for moveably operating each of said nonrotatable pushing members and said pressing elements and an electronic control device for synchronized timed actuation of the drives for separate displacement of the pressing elements and nonrotatable pushing members, each of said drives being controllable by said control device to control the relative positions of said nonrotatable pushing members and pressing elements during conveying of said two parallel stacks of individual strands to form said cable.

8. An apparatus as defined in claim 7, wherein each of said nonrotatable pushing members and said nonrotatable counterabutment members have a scanning surface, said scanning surface of one of said nonrotatable pushing members and said scanning surface of said nonrotatable counterabutment member spaced from said one pushing member along said conveying direction resting against the top side of said cable and said scanning surface of another of said nonrotatable pushing members and said scanning surface of said nonrotatable counterabutment member spaced from said other pushing member along said conveying direction resting against the bottom side of said cable in operation, and a spacing plate is arranged on said scanning surface and has a height above said scanning surface corresponding to a thickness of one of said individual strands.

9. An apparatus as defined in claim 7, wherein each of said nonrotatable pushing members and said nonrotatable counterabutment members have a scanning surface, said scanning surface of one of said nonrotatable pushing members and said scanning surface of said nonrotatable counterabutment member spaced from said one pushing member along said conveying direction resting against the top side of said cable and said scanning surface of another of said nonrotatable pushing members and said scanning surface of said nonrotatable counterabutment member spaced from said other pushing member along said conveying direction resting against the bottom side of said cable in operation, and a spacing plate is arranged on said scanning surface, has a height above said scanning surface and had means for adjusting the height of the spacing plate from the scanning surface.

* * * * *